Aug. 13, 1940.         L. GEROSA ET AL         2,211,721
TRANSPORTING AND DUMPING VEHICLE
Filed Aug. 2, 1939
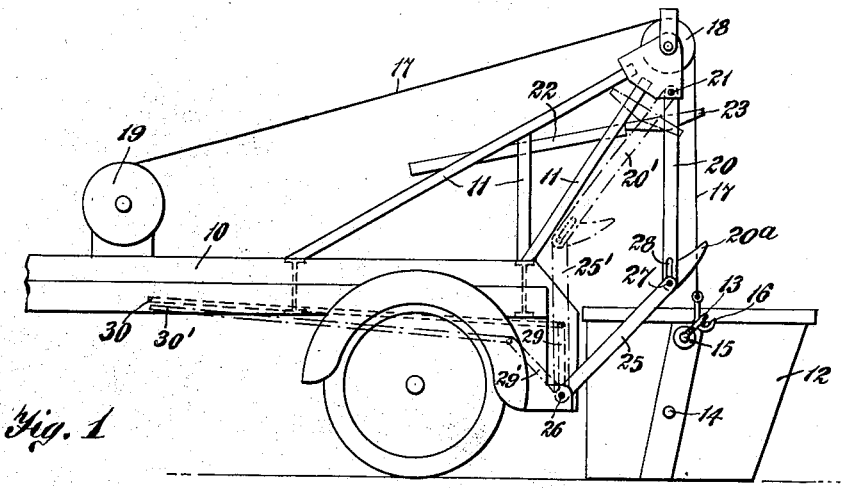
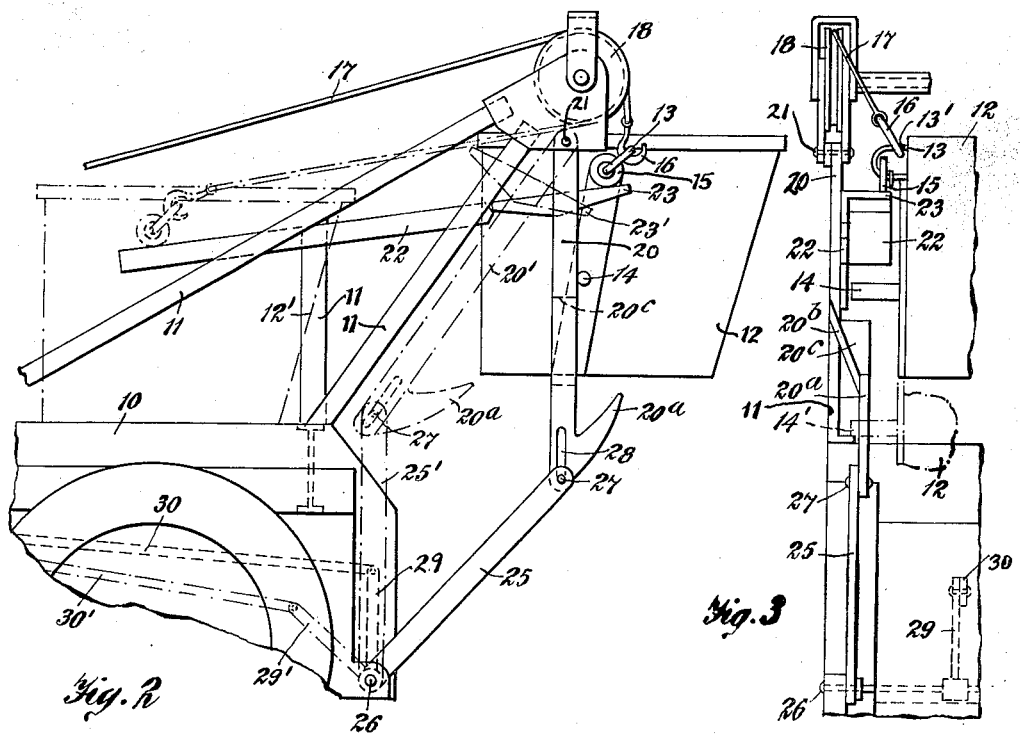
INVENTORS
LAWRENCE GEROSA, and
        GEORGE P. WAGNER
BY
                        ATTORNEY.

Patented Aug. 13, 1940

2,211,721

UNITED STATES PATENT OFFICE 2,211,721

TRANSPORTING AND DUMPING VEHICLE

Lawrence Gerosa and George P. Wagner, Bronx, N. Y., assignors to Speed-Dump, Inc., New York, N. Y., a corporation of New York Application August 2, 1939, Serial No. 287,910

4 Claims. (Cl. 214—75)

This invention relates to new and useful improvements in a transporting and dumping vehicle.

This invention specifically relates to an improvement upon the invention for a transporting and dumping vehicle contained in our patent application Serial No. 252,874, filed on January 26, 1939.

The invention has for its main object the construction of a transporting and dumping vehicle which is characterized by an arrangement whereby a hoisted skip may be lowered upon the rear portion of the chassis of the vehicle, to permit the hoist mechanism to transport a second skip.

Still further the invention proposes the use of side rails mounted upon the frame which is at the rear of the transporting and dumping vehicle, and certain extension rails for the said side rails mounted on certain top side members, and extending forwards and downwards and aligned with the rear ends of said side rails, and being disposed beneath certain rollers mounted on the sides of the skip, in a manner so that when the side members are in a rearward position, then should the skip be lowered it will be carried along the extension rails and side rails to come to a position of rest on the rear of the vehicle chassis. The arrangement is such that when the side members are moved forwards, then if the skip is lowered from its raised position the wheels thereof will not engage the rails, and consequently the skip will be lowered in the regular way.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a fragmentary side elevational view of a transporting and dumping vehicle constructed in accordance with this invention, illustrated with the skip rested on the ground.

Fig. 2 is a fragmentary enlarged detailed view of the rear portion of Fig. 1 but illustrated with the skip in a raised position.

Fig. 3 is a fragmentary rear elevational view of Fig. 2.

The transporting and dumping vehicle in accordance with this invention includes a motor driven chassis 10 having a flat top at its rear end portion. A frame 11 is mounted on the rear portion of the chassis and includes a pair of spaced vertical rearward extending arms upon the sides of the chassis. A skip 12 for holding earth and other heavy materials is engageable between the side arms of the frame and has top pegs 13 at its sides upon its center of gravity, by which the skip may be hoisted and held in a hoisted position. The skip is also provided with bottom pegs 14 at its sides slightly forwards and downwards of the center of gravity, to facilitate dumping of the skip as hereinafter more fully described.

Rollers 15 are mounted upon the sides of the skip near the top thereof, and substantially above the vertical center line of gravity. More particularly the top pegs 13 are in the form of U-shaped brackets turned on their sides. The top arms 13' of these brackets are adapted to be engaged by hooks 16 of the hoist means, hereinafter more fully explained and the bottom arms are provided with the rollers 15, see Figs. 2 and 3.

Cable means is provided and guided over the side arms of the frame 11, and includes cables 17 guided over pulleys 18 mounted upon the top ends of the side arms of the frame 11. The front ends of these cables 17 engage over a hoisting winch 19, or a similar hoisting mechanism. The rear ends of the cables are provided with hooks 16 which are adapted to hook on to the pegs 13. This cable means is adapted to hoist the skip in a way that it is free to swing forwards and rearwards, and also capable of lowering the skip when desired.

A pair of top side members 20 are pivotally supported by pintles 21 upon the top end portions of the arms forming the frame 11. These top side members depend freely and are adapted to freely swing forwards and rearwards. At their lower ends these top side members are provided with hook portions 20a adapted to receive and hold the bottom pegs 14, as hereinafter more fully described. Side rails 22 are stationarily mounted upon the side arms of the frame 11, and extend forwards and downwards. Extension side rails 23 are fixedly mounted on the said top side members 20 and also extend forwards and downwards and in the normally free position of the top side members 20, are in direct alignment with the rear ends of the side rails 22, as illustrated in Fig. 2.

These extension rails 23 are normally beneath the rollers 15 of the skip 12 when the latter is in the hoisted position as illustrated in Fig. 2. The rails 22 and 23 are so arranged that when the skip 12 is lowered by loosening the cables 17, from the position in which it is illustrated in Fig. 2, it will be conveyed forwards by the rollers 15 riding on the rails to a position indicated by the dot and dash lines 12'. In this latter position it is brought to rest on the top at the rear portion of the chassis 10.

A means is provided for moving the top side members 20 forwards and rearwards for moving the hook portions 20a into dumping and out of dumping positions, and also for the purpose of moving the extension rails 23 to and from their positions beneath the rollers 15. This means includes a pair of bottom side members 25 fixed on the ends of a shaft 26, at their bottom ends, rotative on the rear portion of the chassis 10. These side bottom members extend rearwards and upwards, at their upper ends are provided with pintles 27 which engage through slots 28 formed in the bottom ends of the top side members 20.

The shaft 26 is extended transversely across the chassis 10. This shaft, intermediate of its ends is provided with a radial arm 29. A connecting rod 30 connects with this radial arm and extends forwards to the vicinity of the driver of the vehicle, and at this point is connected with a suitable means for moving the radial arm 29 forwards or rearwards so as to operate the bottom side members 25. The details of this arrangement will not be given in this specification since it has been clearly disclosed in the prior patent aplication mentioned previously in this specification. However the arrangement is such that the connecting rod 30 and the radial arm 29 may be moved to the dot and dash line positions 30' and 29' illustrated in Fig. 2, to correspondingly move the bottom side members 25 to the positions indicated by the dot and dash lines 25'. In these latter positions the bottom side members have been moved forwardly, and have correspondingly moved the top side members to positions 20' as indicated by the dot and dash lines. The new positions 23' of the extension rails 23 should be noted. In this position it is possible to lower the skip 12 without the rollers 15 riding upon the extension rails.

The lower portions of the top side members 20 are offset inwards so that the hook portions 20a are at positions in which the bottom pegs 14 of the skip 12 may engage therein. This is indicated by the dot and dash lines 14' indicating the bottom pegs engaged in the hook portions. It should be noted that the upper portions of the top side members 20 are sufficiently spaced from each other so that the pegs 14 may ride past them when the skip 12 rides forwards upon the rails 23 and 22. At the offset area 22b the top side members 20 have extension blocks 20c adapted to act as guides to assist the bottom pegs 14 into the hook portions 20a when this is desired.

The operation of the device is as follows:

In order to hoist the skip 12 from its lowered position illustrated in Fig. 1, it is first necessary that the bottom side members 25 be moved to the dot and dash positions 25'. This moves the hook portions 20a and the extension rails 23 forwards out of possible interference with raising of the skip.

If it is desired to dump the skip, the skip is not fully raised, but raised to a position in which the rollers 15 are below the extension rails 23 and the bottom pegs 14 are at positions above the hook portions 20a. Then the bottom side members are moved rearwards to their full line positions. When the skip is now lowered the bottom pegs 14 will ride into the hook portions 20a, and then upon further slackening of the cable 17 the skip will dump.

If it is desired to deposit the skip upon the rear portion of the chassis 10 it is necessary that the skip 12 be fully raised to the position indicated by the full lines in Figs. 2 and 3. Then it is necessary that the bottom side members 25 be moved rearwards from the dot and dash positions to the full line positions illustrated on the drawings. With this done the extension rails 23 will engage beneath the rollers 15. Now when the cables 17 are slackened the skip 12 will ride forwards and downwards because the rollers 15 are now riding upon the rails 23, and 22. Soon the skip will reach the position indicated by the dot and dash lines 12' in Fig. 2. The hooks 16 may now be disconnected from the top pegs and the cable means used to hoist a second skip. Thus the transporting and dumping vehicle may carry two fully loaded skips.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

1. A dumping and transporting vehicle, comprising a motor driven chassis having a flat top at its rear end portion, a frame mounted on the rear portion of said chassis and having a pair of spaced vertical rearwardly extending arms, a skip for holding earth and other heavy materials and engaged between said arms and having top pegs at its sides above its center of gravity by which the skip is held hoisted and having bottom pegs at its sides slightly forwards and downwards of the center of gravity and having rollers on its sides, cable means guided over said arms and attached to said top pegs to hold said skip in a way so that the skip is free to swing forwards and rearwards, a pair of top side members pivotally supported at their top portions on said arms to swing freely forwards and rearwards and having hook portions for receiving said bottom pegs for dumping the skip when manipulated in a certain way, side rails mounted on said frame and extending forwards and downwards, extension rails for said side rails mounted on said top member and extending forwards and downwards and aligned with the rear ends of said side rails and disposed beneath said rollers for guiding the skip to a position on said flat top when lowered, and means for moving said top side members forwards for moving said hook portions from dumping positions and for moving said extension rails from beneath said rollers.

2. A dumping and transporting vehicle, comprising a motor driven chassis having a flat top at its rear end portion, a frame mounted on the rear portion of said chassis and having a pair of spaced vertical rearwardly extending arms, a skip for holding earth and other heavy materials and engaged between said arms and having top pegs at its sides above its center of gravity by which the skip is held hoisted and having bottom pegs at its sides slightly forwards and downwards of the center of gravity and having rollers on its sides, cable means guided over said arms and attached to said top pegs to hold said skip in a way so that the skip is free to swing forwards and rearwards, a pair of top side members pivotally supported at their top portions on said arms to swing freely forwards and rearwards and having hook portions for receiving said bottom pegs for dumping the skip when manipulated in a certain way, side rails mounted on said frame and extending forwards and downwards, extension rails for said side rails mounted on said top member and extending forwards and downwards and aligned with the rear ends of said side rails and disposed beneath said rollers for guiding the skip to a position on said flat top when lowered, and means for moving said top side members forwards and moving said hook portions from dumping positions and for moving said extension rails from beneath said rollers, the bottom portions of said top side members being offset towards each other so that the bottom pegs of the skip may engage the hook portions thereof while the bottom pegs of the skip in the fully raised position thereof may pass between the top portions of said members when the skip rides forwards on said extension rails.

3. A dumping and transporting vehicle, comprising a motor driven chassis having a flat top at its rear end portion, a frame mounted on the rear portion of said chassis and having a pair of spaced vertical rearwardly extending arms, a skip for holding earth and other heavy materials and engaged between said arms and having top pegs at its sides above its center of gravity by which the skip is held hoisted and having bottom pegs at its sides slightly forwards and downwards of the center of gravity and having rollers on its sides, cable means guided over said arms and attached to said top pegs to hold said skip in a way so that the skip is free to swing forwards and rearwards, a pair of top side members pivotally supported at their top portions on said arms to swing freely forwards and rearwards and having hook portions for receiving said bottom pegs for dumping the skip when manipulated in a certain way, side rails mounted on said frame and extending forwards and downwards, extension rails for said side rails mounted on said top member and extending forwards and downwards and aligned with the rear ends of said side rails and disposed beneath said rollers for guiding the skip to a position on said flat top when lowered, and means for moving said top side members forwards for moving said hook portions from dumping positions and for moving said extension rails from beneath said rollers, comprising a pair of bottom side members mounted on their bottom ends upon said chassis and extending rearwards and upwards and having their top ends pivotally and slidably connected with the bottom ends of said top side members, and means for moving the said bottom side members forwards and rearwards.

4. A dumping and transporting vehicle, comprising a motor driven chassis having a flat top at its rear end portion, a frame mounted on the rear portion of said chassis and having a pair of spaced vertical rearwardly extending arms, a skip for holding earth and other heavy materials and engaged between said arms and having top pegs at its sides above its center of gravity by which the skip is held hoisted and having bottom pegs at its sides slightly forwards and downwards of the center of gravity and having rollers on its sides, cable means guided over said arms and attached to said top pegs to hold said skip in a way so that the skip is free to swing forwards and rearwards, a pair of top side members pivotally supported at their top portions on said arms to swing freely forwards and rearwards and having hook portions for receiving said bottom pegs for dumping the skip when manipulated in a certain way, side rails mounted on said frame and extending forwards and downwards, extension rails for said side rails mounted on said top member and extending forwards and downwards and aligned with the rear ends of said side rails and disposed beneath said rollers for guiding the skip to a position on said flat top when lowered, and means for moving said top side members forwards for moving said hook portions from dumping positions and for moving said extension rails from beneath said rollers, comprising a pair of bottom side members mounted on their bottom ends upon said chassis and extending rearwards and upwards and having their top ends pivotally and slidably connected with the bottom ends of said top side members, and means for moving the said bottom side members forwards and rearwards, including a shaft rotative upon said chassis and fixedly connected with the bottom ends of said bottom side members at their points of pivoting, a radial arm connected with said shaft, and a connecting rod connecting with said radial arm by which the radial arm and shaft, and said bottom side members may be moved.

LAWRENCE GEROSA.
GEORGE P. WAGNER.